United States Patent [19]
Arnold et al.

[11] Patent Number: 5,837,783
[45] Date of Patent: Nov. 17, 1998

[54] SULFO-PENDENT ARYLETHERKETONE POLYMER FILM CONTAINING NLO CHROMOPHORE

[75] Inventors: Fred E. Arnold, Centerville; Narayanan Venkatasubramanian, Bellbrook, both of Ohio

[73] Assignee: The United States of America as represented by the Secretary of the Air Force, Washington, D.C.

[21] Appl. No.: 848,444

[22] Filed: May 8, 1997

[51] Int. Cl.⁶ .................................................. C08G 8/02
[52] U.S. Cl. ......................... 525/471; 528/125; 528/128
[58] Field of Search .................... 528/125, 128, 528/471

[56] References Cited

U.S. PATENT DOCUMENTS

| | | | |
|---|---|---|---|
| 5,049,642 | 9/1991 | Hendy | 528/171 |
| 5,362,836 | 11/1994 | Helmer-Metzmann et al. | 528/126 |
| 5,438,082 | 8/1995 | Helmer-Metzmann et al. | 522/149 |
| 5,492,996 | 2/1996 | Dang et al. | 528/171 |
| 5,505,851 | 4/1996 | Wagener et al. | 210/490 |
| 5,594,075 | 1/1997 | Reinhardt et al. | 525/426 |

OTHER PUBLICATIONS

N. Venkatasubramanian, D. Dean and F.E. Arnold, "Poly(Arylene Ethers) Containing Sulfonic Acid Pendent Groups: Synthesis, Properties and Potential Applications", Polymer Preprints, vol. 37, No. 2, Aug. 1996, published Aug. 2, 1996.

*Primary Examiner*—Jeffrey Mullis
*Attorney, Agent, or Firm*—Charles E. Bricker; Thomas L. Kundert

[57] ABSTRACT

An aryletherketone polymer having repeating units of the formula:

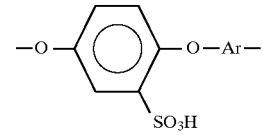

wherein Ar is selected from the group consisting of

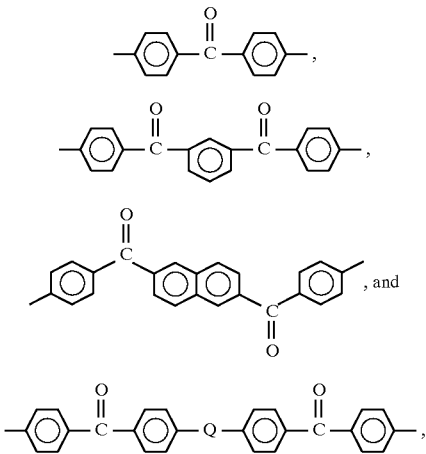

wherein Q is —O—, —CH$_2$— or —CO—, is useful in the dispersion of active NLO chromophores containing a basic functionality to form optically clear films.

5 Claims, No Drawings

SULFO-PENDENT ARYLETHERKETONE POLYMER FILM CONTAINING NLO CHROMOPHORE

RIGHTS OF THE GOVERNMENT

The invention described herein may be manufactured and used by or for the Government of the United States for all governmental purposes without the payment of any royalty.

BACKGROUND OF THE INVENTION

The present invention relates to aryletherketone polymer compositions containing pendent sulfo groups for ionic interaction with second order NLO chromophores.

Considerable research effort has been directed toward the use of organic second-order nonlinear (NLO) polymers in practical devices. The predicted advantages of such organic polymers for frequency conversion and integrated optics applications is headed by potential ease of fabrication and low cost. The polymer properties necessary to efficiently frequency double light at 800 nm in a slab waveguide device include a $\chi^{(2)}$ of 60 pm/V ($\mu\beta=350\times10^{-30}$ esu D) and no absorption at 400 nm.

For a polymeric material to have successful application in an electro-optic (EO) device, it needs to possess a somewhat different set of properties. A practical EO polymer must be spin coatable, easily poled by an electric field or self-assembled, have optical losses below 1 dB/cm and be capable of producing devices with modulation bandwidths of 100 GHz. For a NLO EO polymer material to be commercially realistic, it must also be able to retain a reasonable second-order activity (>30 pm/V at 830 nm) at temperatures experienced during routine microelectronics circuit fabrication (as high as 320° C. for 20 min.). For military applications, it is further necessary that a material retain at least 95% of its original EO coefficient after 10 years at 125° C. Finally, the synthesis of any polymeric material for potential commercial use must address the issues of low cost producibility, toxicity/carcinogenicity and waste disposal.

Reinhardt et al, U.S. Pat. No. 5,594,075, issued Jan. 14, 1997, disclose an acetylenic thermoset monomer which, when mixed with high performance thermoplastic materials, can be poled and cured at elevated temperatures to provide composites with second-order nonlinear optical (NLO) activity, improved thermal stability and optical transparency at wavelengths shorter than 830 nm.

Other research efforts have been directed toward the incorporation of highly active NLO chromophores in guest host polymers. However, guest host polymer systems containing 20 to 30% by weight chromophores tend to phase separate, causing light scattering and loss of optical clarity.

We have prepared high molecular weight sulfo-pendent aryletherketone polymers which provide an ionic association mechanism for basic NLO chromophores. Monodispersed optically clear films are obtained via the ionic association of the sulfonic acid groups on the polyaryletherketone and the basic functionality of the NLO chromophore.

Accordingly, it is an object of the present invention to provide high molecular weight sulfo-pendent aryletherketone polymers.

It is another object of the present invention to provide optically clear films of the sulfo-pendent aryletherketone polymers and active NLO chromophores.

Other objects and advantages of the present invention will be apparent to those skilled in the art.

SUMMARY OF THE INVENTION

In accordance with the present invention there is provided an aryletherketone polymer having repeating units of the formula:

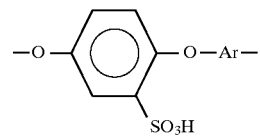

wherein Ar is selected from the group consisting of

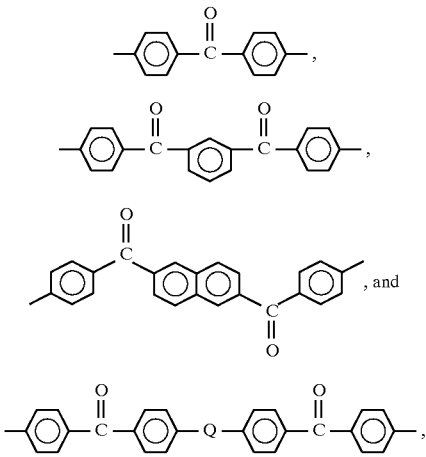

, and wherein Q is —O—, —CH$_2$—or —CO—.

DETAILED DESCRIPTION OF THE INVENTION

The polymer of this invention is prepared by the condensation of hydroquinone 2-potassium sulfonate with a difluoro aromatic ketone. Difluoro aromatic ketones suitable for use in the present invention have the formula F—Ar—F, wherein Ar is as defined previously. Examples of suitable difluoro aromatic ketones include 4,4'-difluorobenzophenone, 4,4'-bis(4-fluorobenzoyl) diphenylether, 4,4'-bis(4-fluorobenzoyl) diphenylmethane, 4,4'-bis(4-fluorobenzoyl) diphenylketone, 2,6-bis(4-fluorobenzoyl) naphthalene and 1,3-bis(4fluorobenzoyl) benzene.

The condensation is conveniently carried out in N-methylpyrrolidone (NMP) using potassium carbonate to generate the potassium salt of the bis-diol. The water formed from the salt generation can be removed as an azeotrope with benzene or toluene. Following removal of this water, additional NMP is added to facilitate stirring. The temperature of the reaction mixture is increased step-wise over a period of about 24 to 48 hours to about 210° to 225° C.

The resulting potassium sulfonate polymer is recovered from solution by pouring the solution into an excess of a non-solvent for the polymer, e.g., methanol. The polymer is then filtered, washed and dried.

The potassium sulfonate polymer is converted to the corresponding sulfonic acid polymer by refluxing the former in dilute HCl. Alternatively, the potassium sulfonate polymer can be dissolved in methanesulfonic acid (MSA), then precipicated in distilled water.

The polymer of this invention is soluble in aprotic solvents, such as N,N-dimethylacetamide (DMAc); the polymer is insoluble in water and alcohol.

The primary utilization of the polymer of this invention is in the dispersion of active NLO chromophores to form optically clear films. The chromophores to be dispersed must contain a basic functionality and must be soluble in an aprotic solvent. Suitable NLO chromophores include the following:

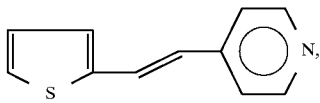

(PTE)

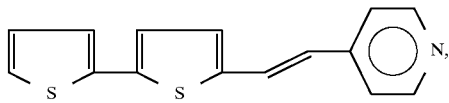

(Thienyl PTE)

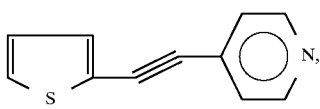

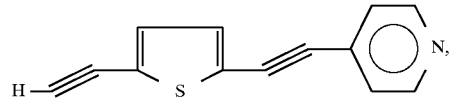

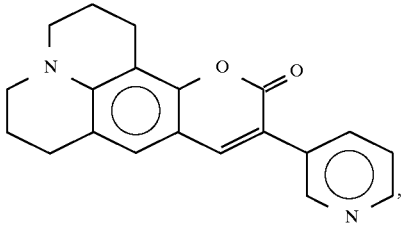

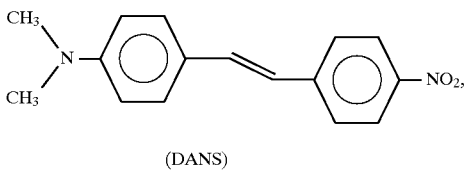

(DANS)

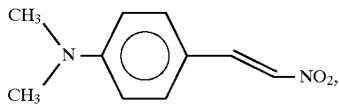

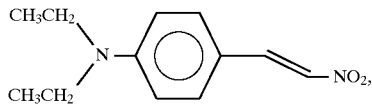

(DEANST)

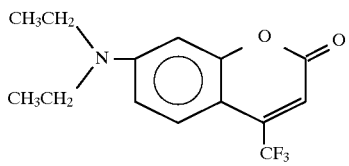

and

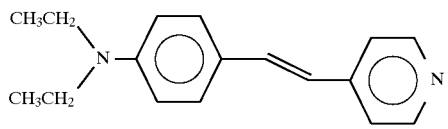

.4-(4-N,N-diethylaminostyryl)pyridine (DEASP)

These chromophores either contain a dialkylamine or pyridine moiety which forms an ionic association with the pendent sulfo groups of the host polymer. The wt% loading of the chromophore is a function of the equivalent sulfo content of the polymer.

The following examples illustrate the invention.

EXAMPLE 1

Sulfo pendent polyarylene ether ketone derived from hydroquinone 2-potassium sulfonate and 4,4'-difluorobenzophenone Hydroquinone 2-potassium sulfonate (2.5087 g, 0.011 moles), 4,4'-difluorobenzophenone (2.398 g, 0.011 moles) and anhydrous potassium carbonate (3.07 g, 0.022 moles) were heated in the presence of 15 ml NMP and 30 ml benzene. The mixture was heated to reflux with the water from the formation of the bisdiol salt being removed as a benzene azeotrope by a Dean Stark trap. An additional 15 ml benzene was added to the reaction mixture as the azeotrope was drawn off. Traces of benzene were removed under a brisk nitrogen flush at a bath temperature of 145° C. The deep yellow reaction mixture was cooled and 45 ml NMP was added to the flask. A green suspension formed on heating at 125° C. overnight. The reaction mixture turned to a darker, homogeneous solution in the temperature range 150°–170° C. and was stirred at 170° C. overnight. The temperature of the solution was raised to 215° C. –220° C. and at least 50 ml NMP was distilled off under a high nitrogen pressure. The dark, concentrated solution (nearly 40 w % solid or polymer) was heated overnight at 180° C.

After cooling, the viscous polymer solution was poured into a large excess of MeOH. Strands of off-white fibrous polymer were obtained. They were broken up in a blender as a methanolic slurry. The polymer was filtered, washed with more methanol and dried. A total of 4.1 gms of polymer was obtained (91% yield) after mechanical losses during blending etc. 1.5 gms of the polymer were stirred in 160 ml distilled water for several hours to remove inorganics. This was filtered, washed with more distilled water and dried. Microanalytical data (for sample dried in vacuum at 100° C.): Calculated: C, 56.14; H, 2.73; S, 7.89; K, 9.62. Found: C, 52.29; H, 2.90; S, 6.29; K, 9.58.

0.45 gms of the polymer potassium sulfonate was heated with a dil. HCl solution (5 ml Conc.HCl+15 ml deionized water) under reflux for two hours. The solid changed color to light brown and hardened on cooling. The mixture was cooled, filtered and the polymer was repeatedly washed with deionized water and dried at 100° C. in vacuum. Microanalytical data: Calculated: C, 61.94; H, 3.29; S, 8.70; K, 0.00. Found: C, 58.43; H, 3.33; S, 7.88; K, 0.05. Inherent viscosity (0.5 g/dl, DMAc, 30° C.)=1.09 dl/g.

EXAMPLE II

Sulfo pendent polyarylene ether ketone derived from hydroquinone 2-potassium sulfonate and 1,3-bis-(4-fluorobenzoyl) benzene Hydroquinone 2-potassium sulfonate (2.5044 g, 0.011 moles), 1,3-bis-(4-fluorobenzoyl) benzene (3.5361 g 0.011 moles) and anhydrous potassium carbonate (3.0753 g, 0.0222 moles) were heated in the presence of 15 ml NMP and 30 ml benzene. The mixture was heated to reflux with the water from the formation of the bisdiol salt being removed as a benzene azeotrope by a Dean Stark trap. An additional 15 ml benzene was added to the reaction mixture as the azeotrope was drawn off. Traces of benzene were removed under a brisk nitrogen flush. The yellow-colored slurry was cooled and 45 ml NMP was added to the flask. The reaction mixture was heated at 140° C. overnight. The reaction mixture was stirred at 170° C. for 12 hours. The temperature of the solution was raised to 210° C. and over 50 ml NMP was distilled off under a brisk nitrogen pressure. The dark, concentrated solution was heated overnight at 170° C. overnight.

After cooling, the viscous polymer solution was poured into a large excess of MeOH. Strands of off-white fibrous polymer were obtained. They were broken up in a blender as a methanolic slurry. The polymer was filtered, washed with more methanol and dried. 4.9 gms of polymer were stirred in 500 ml distilled water for several hours to remove inorganics. This was filtered, washed with more distilled water and dried. Microanalytical data (for sample dried in vacuum at 100° C.): Calculated: C, 61.15; H, 2.97; S, 6.28; K, 7.66. Found: C, 58.89; H, 2.99; S, 5.46; K, 8.09.

1.5 gms of the polymer potassium sulfonate was heated with a dil. HCl solution (15 ml Conc.HCl+40 ml deionized water) under reflux for 3 hours. The solid changed color to light brown. After cooling, the acid solution was decanted off and another 55 ml dilute HCl was added and the mixture refluxed for 3 hours. The mixture was cooled, filtered and the polymer was repeatedly washed with deionized water and dried at 100° C. in vacuum. Microanalytical data: Calculated: C, 66.09; H, 3.42; S, 6.79; K, 0.00. Found: C, 65.30; H, 3.30; S, 6.03; K, 0.03. Inherent viscosity (0.5 g/dl, DMAc, 30° C.)=1.20 dl/g.

EXAMPLE III

NLO film containing 1-(4-pyridyl)-2-(2-thienyl) ethene (PTE)

3 ml DMAC solution of 0.048 g of the polymer of Example I was added a colorless solution of the chromophore (0.022 g) in 2 ml DMAc. The yellow solution was stirred for an hour and filtered and a bright, transparent yellow film was cast after removal of the solvent in high vacuum for 72 hours. Weight of the NLO chromophore dispersed in the polymer matrix was 30%, close to 1:1 molecular stoichiometry for the ionic association of the sulfonic acid pendent of the matrix with the pyridinyl functionality of the NLO chromophore.

EXAMPLE IV

NLO film containing 1-(4-pyridyl)-2-(2-thienyl) ethene (PTE)

To 3 ml DMAc solution of 0.031 g of the polymer of Example II was added a colorless solution of the chromophore (0.011 g) in 2 ml DMAc. The yellow solution was stirred for an hour and filtered and a bright, transparent yellow film was cast after removal of the solvent in high vacuum for 72 hours. Weight of the NLO chromophore dispersed in the polymer matrix was 26%, close to 1:1 molecular stoichiometry for the ionic association of the sulfonic acid pendent of the matrix with the pyridinyl functionality of the NLO chromophore.

EXAMPLE V

NLO film containing 1-(4-pyridyl)-2-(5-(2.2'-bithienyl))ethene (thienyl PTE)

A DMAC solution of the sulfo-polymer of Example II (0.031 g in 3 ml) was mixed with a yellow solution of the NLO chromophore (0.0138 g) in 2 ml DMAc to obtain a bright orange solution. After stirring for a few hours, the filtered solution was taken in a glass casting dish and DMAc was evaporated off under high vacuum in a vacuum desiccator over 72 hours. The homogeneous, transparent orange film was isolated by addition of water to the casting dish and dried in air. Weight of the second-order NLO chromophore dispersed in the sulfo-polymer matrix was 31%, close to 1:1 molecular stoichiometry for the ionic association of the sulfonic acid pendent of the matrix with the pyridinyl functionality of the NLO chromophore.

EXAMPLE VI

NLO film containing 4-(4-N,N-diethylaminostyryl) pyridine (DEASP)

A DMAc solution of the sulfo-polymer of Example II (0.065 g in 6 ml) was mixed with a yellow solution of the NLO chromophore (0.032 g) in 6 ml DMAc to obtain an homogeneous, deep red solution. After stirring, the filtered solution was taken in a glass casting dish and DMAc was evaporated off under high vacuum for 72 hours. The deep red, optically clear NLO film was floated off the dish by addition of water and dried. Weight of the second-order NLO chromophore dispersed in the polymer matrix was 33%, corresponding to 1:1 molecular stoichiometry for the ionic association of the sulfonic acid pendent of the matrix polymer with the pyridinyl functionality of the chromophore.

Various modifications may be made in the instant invention without departing from the spirit and scope of the appended claims.

We claim:

1. A NLO film consisting essentially of an aryletherketone polymer having repeating units of the formula:

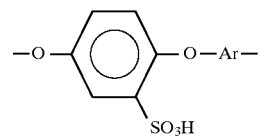

wherein Ar is selected from the group consisting of:

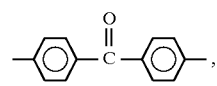

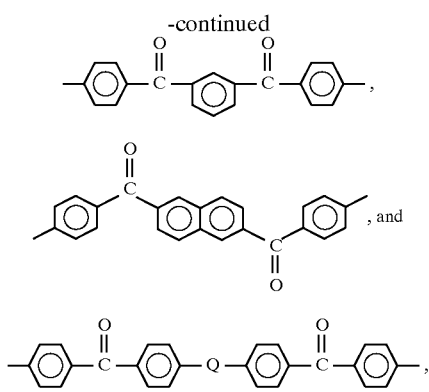

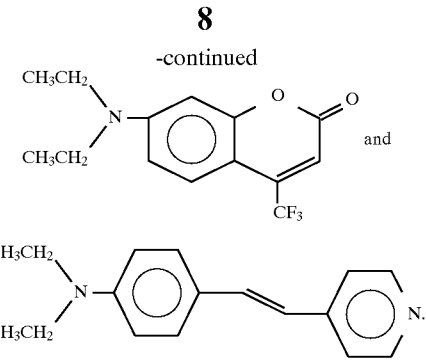

wherein Q is —O—, —CH$_2$— or —CO—;
and a chromophore selected from the group consisting of

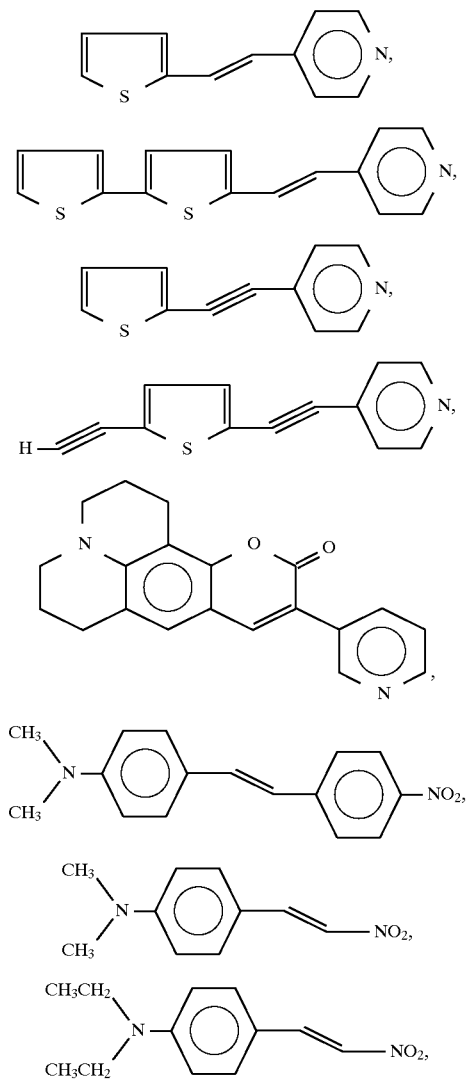

2. The NLO film of claim 1 wherein Ar is

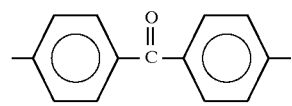

and wherein said chromophore is 1-(4-pyridyl)-2-(2-thienyl)ethene.

3. The NLO film of claim 1 wherein Ar is

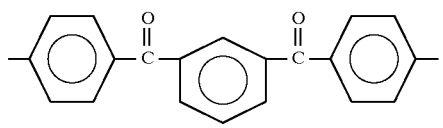

and wherein said chromophore is 1-(4-pyridyl)-2-(2-thienyl)ethene.

4. The NLO film of claim 1 wherein Ar is

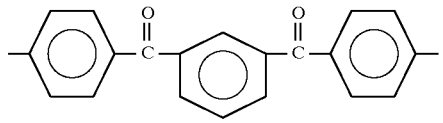

and wherein said chromophore is 1-(4-pyridyl)-2-(5-(2.2'-bithienyl))ethene.

5. The NLO film of claim 1 wherein Ar is

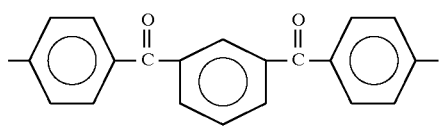

and wherein said chromophore is 4-(4-N,N-diethylaminostyryl)pyridine.

* * * * *